United States Patent [19]
Bader

[11] Patent Number: 5,993,704
[45] Date of Patent: Nov. 30, 1999

[54] PROCESS FOR DETERMINING THE SWITCHOVER POINT IN THE PRODUCTION OF A DIE CASTING

[75] Inventor: Christopherus Bader, Neftenbach, Switzerland

[73] Assignee: K.K. Holding AG, Switzerland

[21] Appl. No.: 09/050,394

[22] Filed: Mar. 31, 1998

[30] Foreign Application Priority Data

Apr. 23, 1997 [CH] Switzerland .................. 0939/97

[51] Int. Cl.[6] .................................. B29C 45/77
[52] U.S. Cl. .............. 264/40.1; 164/155.3; 164/457; 264/328.1; 364/475.08; 425/145; 425/149
[58] Field of Search ................. 264/40.1, 40.5, 264/40.7, 328.1; 425/145, 146, 149, 542; 364/475.05, 475.08; 164/457, 151, 155.3, 155.5

[56] References Cited

U.S. PATENT DOCUMENTS

| | | |
|---|---|---|
| 3,982,440 | 9/1976 | Groleau et al. ............... 264/40.1 |
| 5,174,933 | 12/1992 | Toh et al. ..................... 264/40.5 |
| 5,356,575 | 10/1994 | Krosse et al. ................ 264/40.1 |
| 5,514,311 | 5/1996 | Shimizu et al. . |
| 5,665,283 | 9/1997 | Bader et al. ................... 264/40.1 |
| 5,733,486 | 3/1998 | Hayase et al. ................ 264/40.1 |

FOREIGN PATENT DOCUMENTS

| | | |
|---|---|---|
| 41 40 392A1 | 6/1993 | Germany . |
| 52-31903 | 8/1977 | Japan . |
| 62-046615 | 2/1987 | Japan . |
| 62-087317 | 4/1987 | Japan . |
| 3061017 | 3/1991 | Japan . |

*Primary Examiner*—Jill L. Heitbrink
*Attorney, Agent, or Firm*—Barnes & Thornburg

[57] ABSTRACT

For exactly determining the switchover point when producing plastic injection mouldings, two pressure sensors are arranged successively at intervals in the flow direction of the inflowing material, so that the material reaches them at different points in time, and pressure curves ($p_1$, $p_2$) are recorded inside the mould cavity. From the measured pressures, the differential pressure is derived. When passing from volumetric filing to compression, the pressures in the mould cavity ($p_1$, $p_2$) undergo an abrupt rise (U1, U2). This is reflected in a steep drop of the differential pressure formed, its gradient experiencing a change of sign (V). This indicates that the switchover point has been reached, at which the filling phase must give way to the holding pressure phase.

5 Claims, 3 Drawing Sheets

Fig. 2
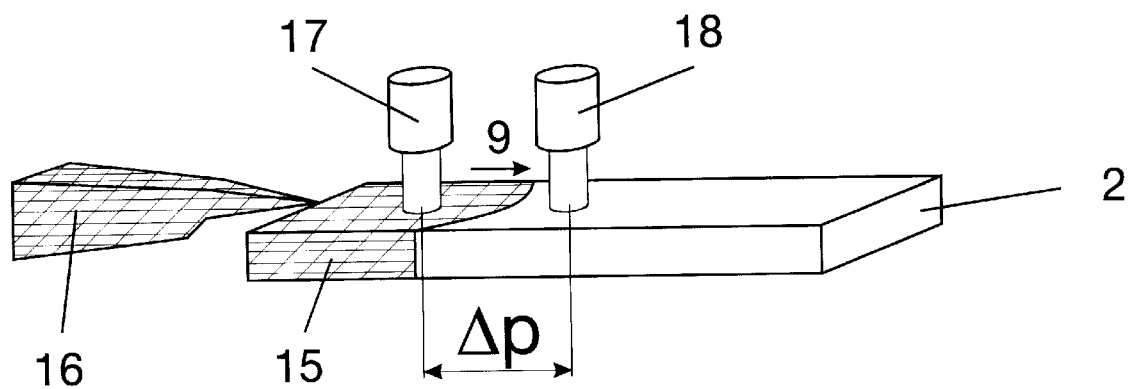
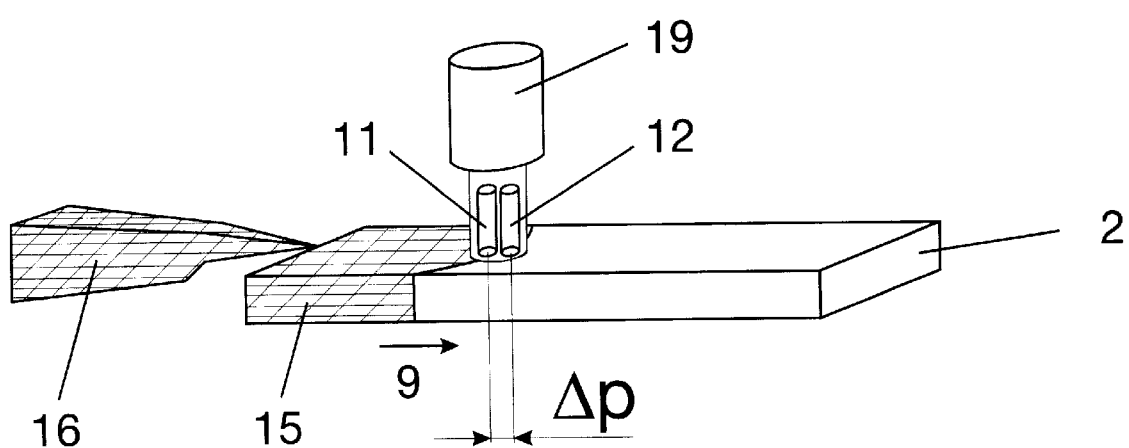
Fig. 3

PROCESS FOR DETERMINING THE SWITCHOVER POINT IN THE PRODUCTION OF A DIE CASTING

BACKGROUND AND SUMMARY OF THE INVENTION

The invention concerns a process for determining the switchover point when producing a die casting or plastic injection moulding.

When producing metal die castings or injection mouldings of plastic or ceramics, plastic material is injected into the cavity of a die or mould by a suitable injection device, after which it is solidified or cured by cooling. The mould is then opened and the moulding ejected. In injection moulding there are two successive phases. During a filling phase, the mould is filled by an injection device usually being controlled according to a filling program so that the delivery rate obeys certain setpoints on a time scale. As soon as the mould is filled, the injection device is usually controlled during a holding pressure phase so that, according to a holding pressure program, the pressure in the cavity reaches certain setpoints, which may likewise be time-dependent.

It is very important that the switchover point, i.e. the instant of changing from the filling program to the holding pressure program, is determined correctly and coincides as exactly as possible with the instant at which the cavity is just filled completely and volumetrically, i.e. without compression. If the switchover is too soon, there will be a danger of the cavity not being completely filled yet, followed by uncontrolled filling under holding pressure. If switchover is too late, excessive pressure will be reached in the cavity, resulting in a moulding that is brittle and liable to fracture due to internal stresses.

It is therefore decisive that the complete filling of the cavity should be detected as exactly as possible before the onset of a drastic pressure rise. One familiar process DE-A-41 40392 attempts to solve this problem by determining approximately the second derivation of the pressure versus time from measured values of the pressure in the cavity at fixed time intervals, deducing that the switchover point has been reached when this value exceeds a fixed threshold and switching over to the holding pressure program.

This solution has, however, proved to be insufficiently reliable, for considerable pressure variations may occur before the mould cavity is completely filled too, causing the second derivative to exceed the threshold briefly and trigger premature switchover. Within the limits of this known process, this shortcoming can be countered only by raising the threshold, which however poses a danger of the complete mould filling being detected too late, so that switchover is delayed.

Furthermore from EP-A-07 07 936, corresponding to U.S. Pat. No. 5,665,283 a process is known whereby the switchover point is determined by the fuzzy logic method. Since in the fuzzy logic system the measured values are processed in successive stages, this approach again gives a switchover point significantly delayed in relation to the instant at which the mould is actually filled volumetrically.

The object of the invention is to further reduce the lag of the indicated switchover point behind the instant of volumetric mould filling, in order to enhance the quality of the mouldings additionally.

This aim is achieved by the invention. At the end of the volumetric filling process, it is known that the mould cavity pressure undergoes an abrupt rise, which is propagated as a compression front throughout the mould cavity within a few milliseconds. Now if the pressures are measured at two points reached by the material and later the compression front at different times, a differential pressure can be calculated from the two measurements. After the abrupt pressure rise mentioned, this differential pressure drops steeply, reflected in an abrupt sign reversal of its gradient. When this drop exceeds an adjustable threshold, this is interpreted as reaching the switchover point, whereby the threshold ensures that chance fluctuations of the pressures and/or their difference are not misinterpreted by the arrangement as reaching the switchover point.

The new process thus reduces the processing of the measured values to a simple differential pressure formation. This takes place very quickly, so that the new process responds much faster to reaching the volumetric filling than that based on fuzzy logic. Moreover the new process demands far less apparatus than the known processes.

In general, a large number of familiar force or pressure measuring elements, such as strain gauges, are suitable for the pressure measurements to be made, but piezoelectric crystals have proved particularly suited. If these have like polarity, the difference is formed in familiar manner from their measured values, possibly after appropriate amplification, whereas with unlike crystal polarity the measured values are added.

The devices for amplifying, subtracting or adding, and the differential pressure falling below the threshold, and for controlling the switchover to the holding pressure phase, are state of the art and available commercially.

The invention will now be explained in more detail with the aid of figures representing a typical embodiment.

BRIEF DESCRIPTION OF THE DRAWINGS

FIGS. 2 and 3 show very schematically arrangements of two pressure measuring points in a mould cavity.

DETAILED DESCRIPTION OF THE PREFERRED EMBODIMENTS

Figure 1:
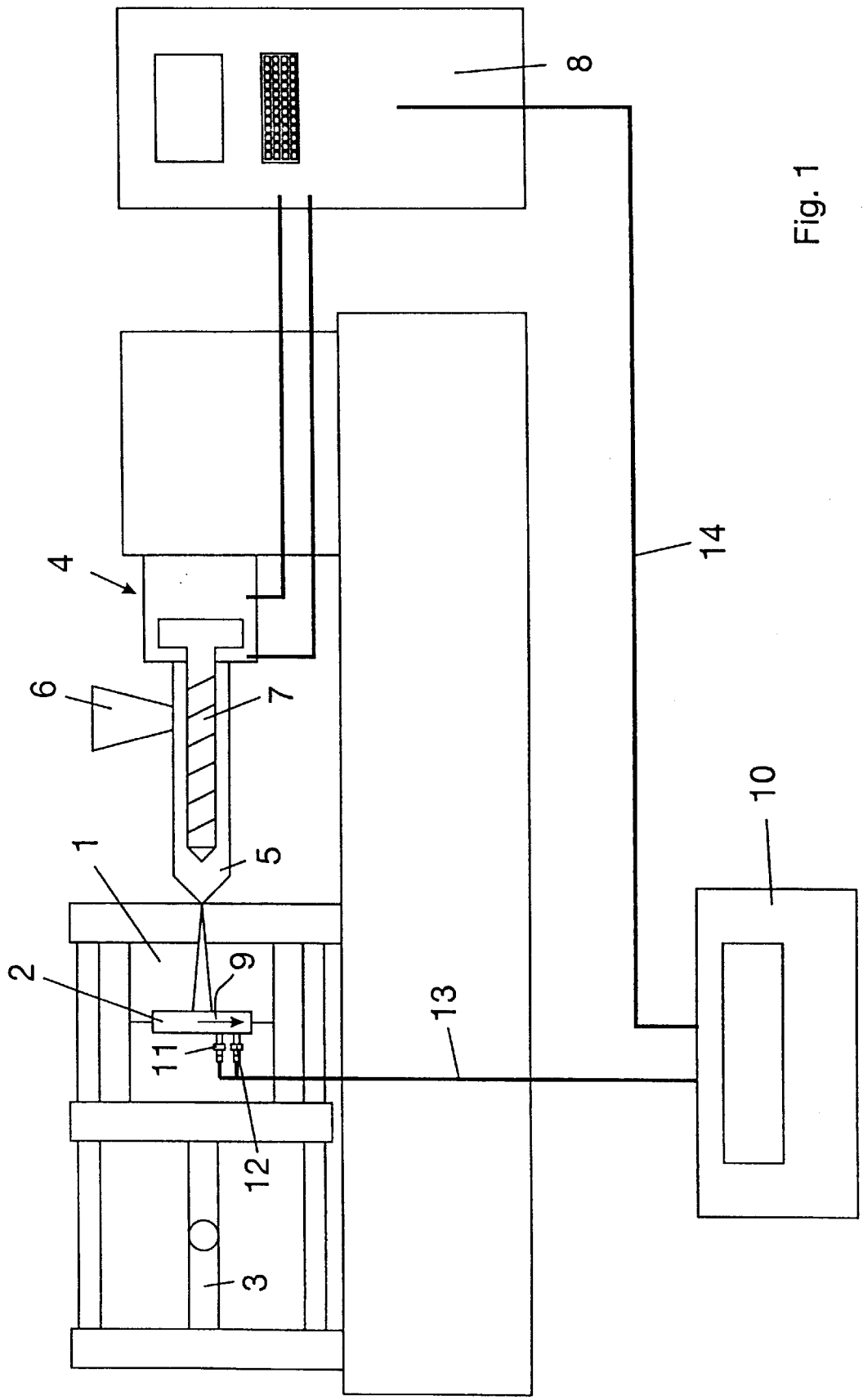
FIG. 1 shows an injection moulding machine for producing a moulding suitable for applying the process according to the invention.

The injection moulding machine in FIG. 1 has a metal mould 1 enclosing a cavity 2 in which the moulding is formed. The mould 1 is closed and opened by a typically hydraulic clamping unit 3. For preparing and injecting the plastic melt there is an injection unit 4 surrounding an injection cylinder 5, at the top of which is a hopper 6 for feeding material. Inside the injection unit 4 is an axially displaceable and rotatable screw 7. The motions of the screw 7 are determined by a control system 8. In the wall of the cavity 2 are two pressure sensors 11, 12 arranged successively in the flow direction of the material, indicated by an arrow 9, and linked with signal processing and evaluation unit 10, which in turn are linked with the control 8.

The equipment for signal processing and evalution unit 10 contains, typically in the familiar manner, charge amplifiers, subtracting or adding units and electronic means for comparing the pressure difference formed with an adjustable threshold. As input signals, unit 10 receives the measured values of sensors 11 and 12 via a signal line 13, while the preferentially digital output signal is led via a line 14 to the control system 8, causing this to switch over the injection unit to the holding pressure phase.

FIGS. 2 and 3 show the mould cavity 2 schematically as a flat body of rectangular cross section. It is already partially filled with material 15, which flows in from the sprue 16. Connected at the mould cavity 2 in FIG. 2 and spaced with an interval between them are two measuring points 17 and 18, each containing a pressure sensor not shown in this figure.

As shown in FIG. 3, the sensors 11 and 12 may also be accommodated together in one measuring unit 19, whereby it must be ensured, however, that with this arrangement too they are exposed successively in time to the inflowing material 15.

Figure 4:
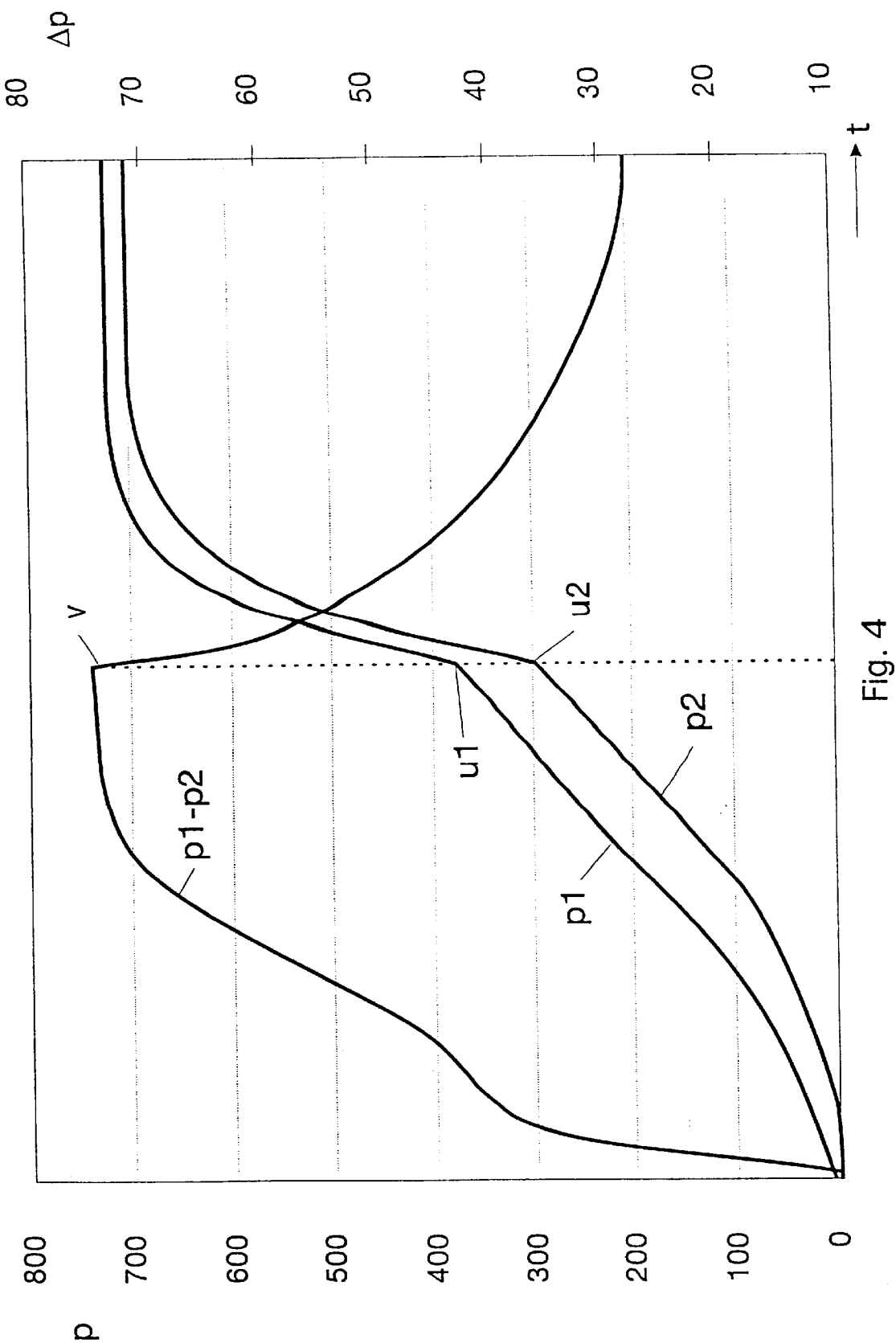
FIG. 4 are plots the pressure curves against time as abscissa at two successively impinged measuring points, and the curve for the differential pressure derived from them.

The sensor 11 nearer to the sprue 16 measures the pressure curve $P_1$ (FIG. 4); after a possibly extremely short delay sensor 12 measures the pressure curve $P_2$ likewise plotted in FIG. 4.

Plotted in FIG. 4 against a time axis of a few hundred milliseconds as ordinates on the left are the measured absolute pressures in arbitrary units and at the right the pressure differences derived from them, again in arbitrary units.

The pressure curve $p_1$ plots the measured values from sensor 11, while pressure curve $p_2$ plots the measurements from sensor 12. FIG. 4 shows that the abrupt change U1 of pressure $p_1$ is virtually simultaneous with change U2 of pressure $p_2$. Likewise the break point V in the resulting pressure difference $\Delta p = p_1 - p_2$, at which reaching the switchover point is signalled, appears only insignificantly delayed. From this break point V, an output signal of signal processing unit 10 is triggered, causing a changeover in the control 8 for injection unit 4 from the filling to the holding pressure phase.

Comparative trials have demonstrated that the new process detects the switchover point quicker than the known fuzzy logic systems. In this way the new process will bring about enhanced quality in die castings and especially plastic injection mouldings.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. A process for determining the switchover point in the production of a die casting or a plastic injection moulding, in which a cavity of a die or mould is filled with material volumetrically, without compressing the material, up to a switchover point, after the switchover point the material being held under a predetermined holding pressure wherein the pressure inside the cavity is measured at two points at least in the cavity spaced at intervals along a flow direction of the material, a differential pressure is determined from the two measured pressures, and the holding pressure is initiated when the differential pressure drops suddenly below an adjustable threshold.

2. A device for controlling a die casting or plastic injection moulding equipment, the equipment including a cavity filled with material, the device including at least two pressure measuring elements, independent and separate from each other and disposed in series at a distance from each other inside the cavity in the flow direction of the material, and the measuring elements are connected by a unit forming a differential to a comparator which compares the differential pressure with an adjustable threshold value, and means for providing a signal output for switching over the equipment to a holding pressure.

3. A device according to claim 2, wherein the pressure measuring elements are piezoelectric crystals.

4. A device according to claim 3, wherein the pressure measuring elements are in a common sensor arrangement.

5. A device according to claim 2, wherein the pressure measuring elements are in a common sensor arrangement.

\* \* \* \* \*